United States Patent [19]

Huang et al.

[11] Patent Number: 5,650,060

[45] Date of Patent: Jul. 22, 1997

[54] IONICALLY CONDUCTIVE AGENT, SYSTEM FOR CATHODIC PROTECTION OF GALVANICALLY ACTIVE METALS, AND METHOD AND APPARATUS FOR USING SAME

[75] Inventors: Haitao Huang; Richard B. Hartman, both of Woodbury; Timothy M. Dietz, St. Paul, all of Minn.

[73] Assignee: Minnesota Mining and Manufacturing Company, St. Paul, Minn.

[21] Appl. No.: 189,443

[22] Filed: Jan. 28, 1994

[51] Int. Cl.$^6$ .................................................. C23F 13/00
[52] U.S. Cl. ..................... 205/730; 205/731; 205/734; 252/500; 428/40.9; 428/355 EN; 428/355 N; 429/216; 429/229
[58] Field of Search ........................ 204/147, 148, 204/196, 197; 205/306, 307, 730–735; 429/229, 216; 252/500; 428/40–42

[56] References Cited

U.S. PATENT DOCUMENTS

| Re. 31,454 | 12/1983 | Hymes | 128/641 |
|---|---|---|---|
| 2,648,717 | 8/1953 | Ross et al. | 429/229 |
| 3,296,105 | 1/1967 | Rushmere | 205/307 |
| 3,451,851 | 6/1969 | Stanimirovitch | 429/216 |
| 3,660,170 | 5/1972 | Rampel | 429/216 |
| 3,734,839 | 5/1973 | Hoyer et al. | 205/307 |

(List continued on next page.)

FOREIGN PATENT DOCUMENTS

| 0 180 431 | 10/1984 | European Pat. Off. | C09D 5/10 |
|---|---|---|---|
| 0 292 428 B1 | 11/1988 | European Pat. Off. | C23F 13/02 |
| 58-209074A | 5/1983 | Japan | 429/216 |
| 62-270135 | 11/1987 | Japan | A61B 5/04 |
| 1 474 413 | 5/1977 | United Kingdom | C23F 13/00 |
| WO86/04099 | 7/1986 | WIPO | C23F 13/02 |
| WO93/01331 | 1/1993 | WIPO | C23F 13/12 |
| WO94/29496 | 12/1994 | WIPO | C23F 13/02 |

OTHER PUBLICATIONS

Brodd et al., "Zinc", *Encyclopedia of Electrochemistry of the Elements*, Chapter V–1, pp. 35–40 (Marcel Dekker, Inc., New York) 1973 month unavailable.

Brodd et al., "Standard Potentials in Aqueous Solution", Chapter 10, pp. 249–257 (Marcel Dekker, Inc., New York) 1985 month unavailable.

Foller, "Effects of additives on the suspension of products of discharge of zinc in alkaline solution", *Journal of Applied Electrochemistry*, 17, pp. 1296–1303 (1987) month unavailable.

Sekine et al., "Corrosion Inhibition of Mild Steel by Cationic and Anionic Polymers in Cooling Water System", *J. Electrochem. Soc.*, vol. 139, No. 11, pp. 3167–3173 (Nov. 1992).

Schoolmann, "Properties and Application of a Proton Conducting Polymer: The $BPEIxH_3PD_4$ System", *Electrochimica Acta*, vol. 37, No. 9, pp. 1619–1621, (1991) month unavailable.

STN International Abstract of Japanese Kokai 55050471.

*Primary Examiner*—T. Tung
*Attorney, Agent, or Firm*—Gary L. Griswold; Walter N. Kirn; John H. Hornickel

[57] ABSTRACT

An ionically conductive agent having means for reducing passivation of metal subject to anodic dissolution is disclosed. The ionically conductive agent is interposed between metal to be protected from corrosion and metal to be sacrificed to provide cathodic protection. An electrical connection between the two metals completes a galvanic circuit. The means for reducing passivation can be either a complexing agent for ions of the metal to be sacrificed or can be a membrane to inhibit flow of ions that would affect the ability of the ionically conductive medium to support continued anodic metal dissolution. The ionically conductive agent and a system for cathodic protection using the ionically conductive agent is particularly suitable for a galvanic circuit to cathodically protect reinforcement bars in concrete structures such as transportation bridges, transportation highways, parking facilities, and balconies exposed to corrosive environments.

20 Claims, 2 Drawing Sheets

U.S. PATENT DOCUMENTS

| | | | |
|---|---|---|---|
| 3,930,882 | 1/1976 | Ohsawa et al. | 429/216 |
| 4,095,015 | 6/1978 | Siwersson et al. | 429/15 |
| 4,255,241 | 3/1981 | Kroon et al. | 204/147 |
| 4,391,278 | 7/1983 | Cahalan et al. | 128/640 |
| 4,496,444 | 1/1985 | Bagnulo | 204/148 |
| 4,506,485 | 3/1985 | Apostolos | 52/515 |
| 4,524,087 | 6/1985 | Engel | 427/2 |
| 4,528,084 | 7/1985 | Beer et al. | 204/290 F |
| 4,539,996 | 9/1985 | Engel | 128/640 |
| 4,554,924 | 11/1985 | Engel | 128/640 |
| 4,563,403 | 1/1986 | Julian | 429/216 |
| 4,692,066 | 9/1987 | Clear | 405/216 |
| 4,699,146 | 10/1987 | Sieverding | 128/640 |
| 4,708,888 | 11/1987 | Mitchell et al. | 427/126.1 |
| 4,722,772 | 2/1988 | Bissot | 204/98 |
| 4,734,170 | 3/1988 | Oda et al. | 204/98 |
| 4,750,482 | 6/1988 | Sieverding | 128/156 |
| 4,812,212 | 3/1989 | Dimond et al. | 204/147 |
| 4,832,803 | 5/1989 | Vennesland et al. | 204/130 |
| 4,848,353 | 7/1989 | Engel | 128/640 |
| 4,880,517 | 11/1989 | Bennett et al. | 204/196 |
| 5,098,543 | 3/1992 | Bennett et al. | 204/196 |
| 5,183,694 | 2/1993 | Webb | 428/67 |
| 5,190,660 | 3/1993 | Lindoy et al. | 210/670 |
| 5,198,082 | 3/1993 | Vennesland et al. | 204/130 |
| 5,225,058 | 7/1993 | Bazzoni et al. | 204/196 |
| 5,225,473 | 7/1993 | Duan | 524/388 |
| 5,270,358 | 12/1993 | Asmus | 524/55 |
| 5,276,079 | 1/1994 | Duan et al. | 524/386 |
| 5,292,411 | 3/1994 | Bartholomew et al. | 204/147 |
| 5,296,120 | 3/1994 | Bennett et al. | 204/147 |
| 5,352,342 | 10/1994 | Riffe | 204/147 |
| 5,380,131 | 1/1995 | Crawford | 405/216 |

IONICALLY CONDUCTIVE AGENT, SYSTEM FOR CATHODIC PROTECTION OF GALVANICALLY ACTIVE METALS, AND METHOD AND APPARATUS FOR USING SAME

FIELD OF THE INVENTION

This invention relates to ionically conductive agents, systems for cathodic protection of galvanically active metals, methods of cathodic protection using the ionically conductive agent, and apparatus protected by the system, agent, and method.

BACKGROUND OF THE INVENTION

The economic damage caused by the corrosive effect of the oxidation of galvanically active metals cannot be underestimated in civil engineering applications. Bridges, parking decks, balconies, and other reinforced concrete structures are continually susceptible to weakened structure due to corrosion of reinforcing metals within such concrete structures.

Weakened structure is caused in one circumstance by corroded reinforcing bars (also known as rebars) that occupy a greater volume than uncorroded rebars. The greater volume occupied by the corroded rebars produces tension in the concrete, which causes cracks. Cracks permit more corrosion due to additional exposure to salts penetrating the volume of the concrete. A vicious cycle of corrosion, tension, and cracking accelerates until the structure fails.

To combat the deterioration of reinforcing metallic structures within concrete, the art has developed sacrificial galvanically active metal/adhesive anodic tape systems for cathodic protection of reinforcing bars in concrete structures. These anodic tape systems are designed to sacrifice a metal such as zinc in a galvanic circuit created by electrical connection of the reinforcing metallic bars having a substantial iron content and zinc which is affixed to the concrete by an ionically-conductive agent, usually a pressure-sensitive adhesive. However, deficiencies exist in this system such that cathodic protection of the reinforcing bars ceases prior to the complete sacrifice of the zinc metal. Useful life of a cathodic protection system is dependent on the thickness of the metal and can provide protection for between 10–20 years if the cathodic protection is not interrupted.

A general discussion of inhibiting corrosion in reinforced concrete is found in U.S. Pat. No. 5,183,694 (Webb) from corrosion caused by strong Lewis bases, such as chloride ions and/or a loss of pH to below 10 and from corrosion caused by carbonation of the concrete by penetration of carbon dioxide from the atmosphere.

A second discussion of the effects of cathodic protection is found in U.S. Pat. No. 5,225,058 (Bazzoni et al.), where concern about hydrogen embrittlement is addressed when high tension steel in prestressed concrete structure is protected by a powered system.

SUMMARY OF THE INVENTION

The present invention has found both the cause of the problem of premature cessation of cathodic protection and a solution for that premature cessation of cathodic protection. It has been found in the present invention that the problem of premature cessation of cathodic protection is caused by the formation of a nonconductive passivation layer at the interface between the zinc and the material that the zinc contacts in the galvanic circuit which inhibits the flow of current in the galvanic circuit designed to sacrifice zinc metal. Upon complete formation of a passivation layer, dissolution of zinc metal ceases, current ceases, and cathodic protection ceases.

The zinc dissolution reaction for many electrochemical systems depends on the pH of the environment. At a pH less than about 7, such as 4–6, the dissolution of zinc proceeds unabated without substantial formation of a passivation layer.

At a pH greater than about 7, zinc dissolution occurs according to the following equation 1:

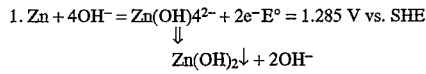

$$Zn(OH)_2\downarrow + 2OH^-$$

In this instance, zinc hydroxide is precipitated if its solubility limit is exceeded. This precipitated zinc hydroxide forms the passivation layer which causes the dissolution of zinc metal to cease, also causing a cessation of current and cathodic protection.

The present invention solves this problem by minimizing the conditions that permit the formation of a passivation layer. One method employed in the solution to the problem reduces the pH in the material where zinc metal dissolves to a pH of about 4–6, where passivation layer formation is minimized. Another method employed in the solution to the problem solubilizes any precipitate that can become a passivation layer.

The present invention provides an ionically-conductive agent for galvanically active metals in an electrochemical system, comprising an ionically-conductive medium and means associated with that medium for reducing passivation of metal subject to anodic dissolution.

The ionically conductive agent can be a solid in the form of an ionically conductive layer contacting another material. Also, the agent can be in the form of a liquid for use in an electroplating bath.

In one aspect of the invention, the means for reducing passivation of metal subject to anodic dissolution employs a complexing agent to facilitate continued dissolution of metal in order to avoid precipitation of metallic hydroxides that would otherwise form a passivation layer on the metal contacting the ionically conductive medium.

The ionically-conductive agent of the present invention provides a method to enhance anodic activity of zinc dissolution reactions in various alkaline environments. Among these nonlimiting examples of these environments are: (1) alkaline aqueous solutions such as those used in zinc-alkaline batteries and zinc electroplating baths, and (2) ionically conductive hydrogels or ionically conductive pressure-sensitive adhesives, such as those used in zinc/adhesive anodic tape systems of cathodic protection of metallic reinforcing bars in concrete structures.

Concrete naturally can have a pH of about 11–13, creating the potential for changing the pH of any tape system contacting that concrete. Further, the pH of the tape system can change into a range where zinc hydroxide can precipitate and form a passivation layer.

In another aspect of the invention, the means for reducing passivation of metal subject to anodic dissolution employs an ion selective membrane that inhibits the exchange of $OH^-$ or $H^+$ ions in the ionically conductive medium to maintain the pH of the ionically conductive medium, where the pH is favorable to dissolution of the sacrificial metal. An alteration of the pH could diminish the ability of the ionically conductive medium to support continued anodic dissolution.

Thus, in one embodiment, the means of reducing passivation of metal contacting an ionically conductive medium is a metal ion complexing agent, and in a second embodiment of the invention is a barrier membrane for inhibiting undesired exchange of OH⁻ or H⁺ ions from one side of the membrane to the other in the ionically conductive medium.

In another aspect of the invention, a system for cathodic protection of galvanically active metals from corrosion, comprises an ionically conductive agent described above, a layer of sacrificial galvanically active metal having a greater dissolution potential than the galvanically active metal to be protected, the layer contacting the ionically conductive agent; and electrical connection between the sacrificial galvanically active metal and the galvanically active metal to be protected cathodically.

In another aspect of the invention, a method for the protection of structures through the dissolution of galvanically active metal anodes using the ionically conductive agent described above.

In another aspect of the invention, the apparatus or structure to be protected employs the method or system described above using the ionically conductive agent described above.

In another aspect of the invention, an ionically conductive medium used in the ionically conductive agent can be directly applied to a structure of galvanically active metal to be protected. The invention provides a structure of galvanically active metal directly exposed to a surrounding corrosive environment, protected by a system, comprising an ionically conductive medium contacting the galvanically active metallic structure, a layer of sacrificial galvanically active metal having a greater dissolution potential than the galvanically active metallic structure to be protected, the layer contacting the ionically conductive agent; and electrical connection between the sacrificial galvanically active metal and the galvanically active metallic structure to be protected cathodically.

A feature of the invention is the cathodic protection of a structure containing a metal to be protected employing a galvanic circuit which continues in duration until exhaustion of the galvanically active metal to be sacrificed.

Another feature of the present invention is the protection of structures that are susceptible to corrosion where the metal to be protected is embedded within a structure having a pH greater than about 7.

Another feature of the present invention is a system for cathodic protection of a metal to be protected using a sacrificial galvanically active metal, where the metal to be protected is susceptible to corrosion in the environment and is not embedded in a structure.

Another feature of the present invention is the use of an ionically conductive agent for alkaline aqueous solutions to inhibit the formation of a passivation layer on an anode of an electroplating bath.

Another feature of the present invention is the use of an ionically conductive agent with the present invention for use to prevent the formation of a passivation layer on an anode of an alkaline battery.

An advantage of the present invention is the use of an ionically conductive agent of the present invention that maximizes the use of the metal to be sacrificed in cathodic protection by minimizing the formation of a passivation layer at the surface of the anode in a galvanic circuit.

Another advantage of the present invention is the use of an ionically conductive agent of the present invention in a galvanic circuit that can be used with prestressed concrete structures containing high tension steel reinforcement without potential danger otherwise caused by hydrogen embrittlement when the structure is protected by a powered system.

A further description of embodiments of the invention follows a brief description of the drawings.

EMBODIMENTS OF THE INVENTION

Metal to be Protected

Figure 1:
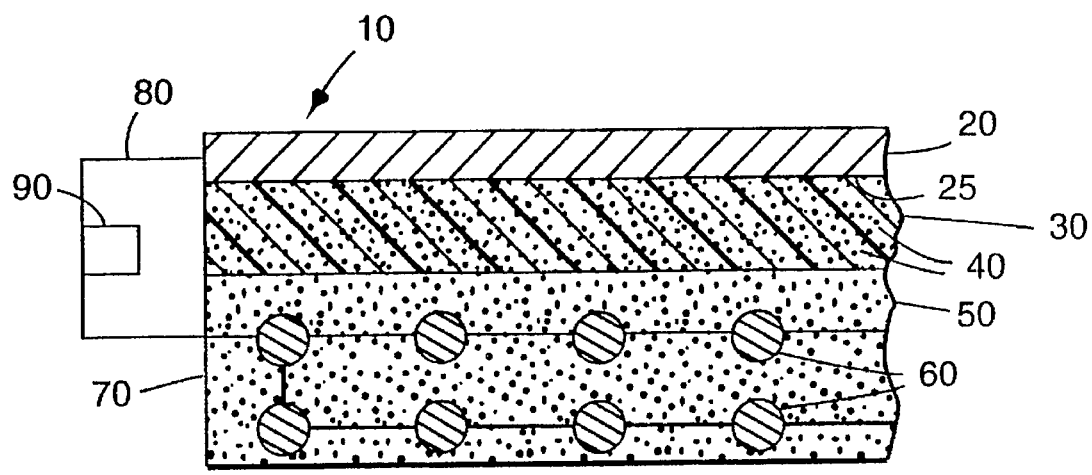
FIG. 1 is a cross-sectional view of a system for cathodic protection according to the present invention using an ionically conductive agent of one embodiment of the present invention.

The present invention is configured to protect metal that is otherwise susceptible to the effects of corrosion in the environment. The environment can be exposure to the air, exposure to earth, or exposure to fresh water or salt water, or any other naturally-occurring or manmade corrosive environment.

The metal to be protected can be embedded within a structure of nonmetallic composition or metallic composition.

The metal to be protected can be the structure without additional compositions associated therewith. When the metal is directly exposed to the surrounding corrosive environment, it can be directly contacted by the ionically conductive medium without need for the means for reducing passivation of metal subject to anodic dissolution.

Nonlimiting examples of metals to be protected include metallic reinforcing bars or mesh embedded in concrete in roadways, parking decks, bridges, and concrete buildings including balconies; metallic structures embedded in the earth such as pipelines, tunnels, tunnels portals, and culverts; metallic structures embedded in concrete in contact with fresh water or salt water, such as piers, pipelines, drilling platforms, and other marine structures; metallic structures exposed to air such as statues, bridges, and exposed structural iron work; and metallic structures that are especially susceptible to corrosion such as body panels, undercarriages, and mufflers of motor vehicles.

Most commonly, the metal to be protected from corrosion is iron and its various forms including steel and its various alloys that are susceptible to corrosion from exposure to salts, particularly chloride ion. Most particularly, iron reinforcing bars ("rebars") embedded in concrete can be protected according to the present invention.

Rebars typically are laid in at least two layers within a form prior to concrete pouring. These layers of rebars are mechanically connected within the layers using metal wires or straps (causing also an electrical connection within the layer). The layers are likewise connected at least at one location (causing an electrical connection between the layers). From the outer environment, salt penetrates the exposed surface of the concrete, destroys the protection of the rebar at that location, and causes corrosion of the rebar. The pH difference created between the corroded location and uncorroded location accelerates further corrosion of the corroded location. The corroded rebars occupy a greater volume than uncorroded rebars. The greater volume occupied by the corroded rebars produces tension in the concrete, which causes cracks. Cracks permit more corrosion due to additional exposure of the concrete surface to salts penetrating the volume of the concrete. A vicious cycle of corrosion, tension, and cracking accelerates until the structure fails.

The metal to be protected can be embedded in any type of concrete cast in any three dimensional form. The performance of the present invention is particularly suitable for protection of rebars in concrete because the ionically conductive agent of the present invention operates to reduce passivation of metal subject to anodic dissolution through the ionically conductive medium which is in contact with concrete having a pH greater than 7 and typically as high as 13.

Metal to be Sacrificed

The galvanically active metal subject to anodic dissolution depends on the metal to be protected. The galvanically active metal selected according to the present invention must have a greater dissolution potential than the metal to be protected. For example, when iron is the metal to be protected in the system of the present invention, magnesium, aluminum, and zinc are acceptable as the galvanically active metal for use in the present invention. Of these three metals, zinc is particularly preferred.

The galvanically active metals can be pure metals or alloys of metal where at least one metal has a greater dissolution potential than the metal to be protected.

The galvanically active metal can be self supported as a plate or it can be coated or laminated on an inert substrate. The galvanically active metal can be positioned continuously over the structure to be protected, in strips intermittently, and can be of a uniform or non-uniform thickness. All dimensioning of the galvanically active metal depends on the solid geometry of the structure to be protected.

The thickness of the galvanically active metal controls the duration of cathodic protection in the system according to the present invention. The galvanically active metal is sacrificed through dissolution of metal into the ionically conductive agent as a completion of the galvanic circuit formed by the electrical connection of the metal to be protected with the metal to be sacrificed.

In a preferred embodiment, cathodic protection of rebars in concrete, the galvanically active metal is zinc and has a thickness of about 0.1 mm to about 5 mm, and is commercially available from about 38 gage to about 6 gage. Preferably, the thickness is from about 0.5 mm to about 2.5 mm and about 18 gage because at this thickness the metal is a foil that is relatively easy to laminate or form to the contours of the structure to be protected. There is no upper limit to thickness that provides duration of cathodic protection than the practical limits of assuring contact of the system with the structure to be protected. It is preferred to provide at least about 10 years protection to structures before replacement of the system.

Alternatively, the galvanically active metal or alloys thereof can be applied to an inert substrate, such as a polyolefin film, in or as inks or paints, or by metallic deposition, depending on the thickness desired for the duration of cathodic protection desired.

Optionally, it is desirable to embed the cathodic protection system in the structure to be protected for aesthetic reasons as well as additional protection for the cathodic protection system. Alternatively, the system can be covered from the environment by painting the exposed surfaces of the metal to be sacrificed with a sealing paint such as an epoxy paint.

Ionically Conductive Agent

The ionically conductive agent of the present invention comprises an ionically conductive medium and means for reducing passivation of metal subject to anodic dissolution.

The ionically conductive medium can be any medium that is capable of transporting ionic charges. The ionically conductive medium preferably is compliant, dimensionally stable, and capable of substantially contacting the surface of the metal to be protected or the structure within which the metal is embedded. The ionically conductive medium is also compliant with the metal to be sacrificed.

The ionically conductive agent serves as an interface between the anode and cathode of a galvanic circuit and inhibits formation of a passivation layer at the surface of the anode. The cathode of the galvanic circuit is the metal to be protected; the anode of the galvanic circuit is the metal to be sacrificed through dissolution.

Nonlimiting examples of ionically conductive media are natural and synthetic elastomers such as rubbers and gums, hydrogels, and hydrophilic pressure sensitive adhesives.

Preferably, to provide both ionic conductivity and a compliant structure, the ionically conductive medium of the present invention is a hydrogel.

Nonlimiting examples of hydrogel ionically conductive media for the present invention include polyacrylic acids, poly(meth)acrylic acids, polyalkylene oxides, polyvinyl alcohols, poly(N-vinyl lactams), polyacrylamides, poly (meth) acrylamides, and those gels comprising hydrocolloids and swelling agents disclosed in U.S. Pat. No. 5,270,358 (Asmus), the disclosure of which is incorporated by reference herein.

More preferably, the ionically conductive medium of the present invention can be a hydrophilic pressure sensitive adhesive that is ionically conductive. Nonlimiting examples of hydrophilic pressure sensitive adhesives are ionically conductive pressure sensitive adhesive compositions disclosed in U.S. Pat. Nos. 4,524,087; 4,539,996; 4,554,924; and 4,848,353 (all Engel); 5,225,473 (Duan); and 5,276,079 (Duan et al.); copending, coassigned U.S. patent application Ser. Nos. 07/792,957 (Uy et al.) filed Nov. 15, 1991, now abandoned and 08/188,269, filed Jan. 28, 1994, now abandoned, (Attorney Docket 48237USA7A) (Dietz et al.), the disclosures of which are incorporated by reference; and adhesives disclosed in U.S. Pat. Nos. RE31,454 (Hymes); 4,391,278 (Cahalan); 4,699,146 and 4,750,482 (both Sieverding); and 4,635,642.

More preferably, the present invention uses a polymeric pressure sensitive adhesive prepared from acrylamido-2-methyl-propanesulfonic acid, in any salt form, ("AMPS"), commercially available from Lubrizol, Inc. of Wickliffe, Ohio or a N-vinyl-pyrrolidone/acrylic acid copolymer pressure sensitive adhesive disclosed in U.S. Pat. No. 4,848,353 (Engel).

Optionally, one can provide dimensional stability for the ionically conductive medium by providing a scrim or other reinforcement for the medium. Nonlimiting examples of scrims are disclosed as used in the formation of adhesives by a solventless process in the Engel patents disclosed above.

Also, optionally, one can enhance the ionic conductivity of the ionically conductive medium by adding amounts of electrolyte to the medium. Halide salts of alkali metals are preferred typically comprising less than about 10 weight percent of the medium. Again, the Engel patents, and the Duan patents disclose acceptable electrolytes for use in hydrophilic pressure sensitive adhesives. LiCl is particularly preferred as an electrolyte.

Means for Reducing Passivation of Metal Subject to Anodic Dissolution

In one embodiment of the present invention, the means for reducing passivation is a metal complexing agent that facilitates transfer of galvanically active metal ions from the metal to be sacrificed toward the metal to be protected. Such complexing agents are commercially available but unexpectedly are useful in reducing passivation of the metal to be dissolved anodically.

These complexing agents inhibit the precipitation of galvanically active metal ions in Equation 1 identified above that otherwise would form a passivation layer. Formation of the passivation layer prematurely ceases the current of the galvanic circuit.

Complexing agents useful in the ionically conductive agent of the present invention are those complexing agents which are capable of intimately dispersing or otherwise dissolving into the ionically conductive medium in a manner that permits controlled transfer of galvanically active ions through the ionically conductive medium. Some complexing agents are of a suitable size that permits multiple complexing of multiple portions of the complexing agent with the same metallic ion. Other complexing agents provide a single complexing site for galvanically active metal ion.

The complexing agents can be selected from the group consisting of molecular complexing agents that are free for diffusion and polymeric complexing agents that remain in the ionically conductive medium.

Nonlimiting examples of molecular complexing agents are ethylenediamine tetraacetic acid and its salts (collectively "EDTA"), cyanide compounds such as NaCN and KCN, and thiocyanate compounds such as NaSCN and KSCN.

Nonlimiting examples of polymeric complexing agents are poly(vinyl amines), poly(allyl amines), poly(alkylene amines), poly(ethylenimine)("PEI"), poly(vinyl pyridines), poly(vinyl pyrroles), poly(N-vinyl lactams) and poly (alkylene oxides).

Of these complexing agents, PEI is presently preferred due to its commercial availability, its low cost, its complexing ability in a pH range compatible with the pH of reinforced concrete structures, its availability in an aqueous solution form, its nonreactivity with the preferred hydrophilic pressure sensitive adhesives used in the ionically conductive medium, and its electrochemical stability throughout completion of the galvanic circuit duration.

Complexing agents can be added to the ionically conductive medium in any effective weight percent to serve as a complexing agent for a dissolved metal, and desirably in a weight percent ranging from about 1 to about 15 weight percent of the ionically conductive medium. Preferably, such weight percent ranges from about 3 to about 6 weight percent.

As described above, the complexing agent reduces passivation of the sacrificial metal by stabilizing the metallic ions formed by the dissolution of the metal. Such stabilization includes both solubilizing of the metallic ions and the inhibition of the formation of a passivation layer at or near the surface of the sacrificial metal.

Ion Selective Membrane

In a second embodiment of the present invention, the means for reducing passivation of the sacrificial metal subject to anodic dissolution does not concern the complexing of galvanically active metallic ions in the ionically conductive medium. Rather, the second embodiment concerns the maintenance of pH of the ionically conductive medium to continue to serve in the interface between the metal to be sacrificed and the metal to be protected. In the ionically selective membrane, one can inhibit the flow of hydroxide ions that would otherwise alter the favorable pH of the ionically conductive medium in order to maintain the pH of the ionically conductive medium at a range where dissolution of the metal proceeds without precipitation capable of forming a passivation layer. Alternatively, one can inhibit the flow of hydrogen ions which also maintains the pH of the ionically conductive medium.

When the ionically conductive medium is a pressure sensitive adhesive which is compliant and in substantial contact with a structure having a different pH, the pH of the pressure sensitive adhesive is changed due to the exchange of $OH^{31}$ and $H^+$ ions between the adhesive and the structure.

In the preferred embodiment to protect metal embedded in concrete which has a naturally occurring pH of about 12–13, one can employ a membrane in the ionically conductive medium to inhibit the flow of hydroxide ions from the concrete toward the metal to be sacrificed. Conversely, one can inhibit the flow of hydrogen ions from the metal to be sacrificed toward the metal to be protected. In both types of membranes, the goal of maintaining pH of the ionically conductive medium also promotes dissolution of galvanically active metal into ions and transport of ionic charges in a galvanic circuit, as well as inhibition of the formation of a passivation layer of precipitated metallic hydroxide, is maintained.

The ionically selective membranes can be any membrane which is permeable to the ions of the metal to be sacrificed other than ions of $OH^-$ or $H^+$. The membrane preferably is chemically stable in the ionically conductive medium, dimensionally stable, highly conductive, and otherwise resistant to deterioration in the galvanic circuit employed for cathodic protection, electroplating, batteries, and the like.

More preferably, the membrane can be any membrane that is impermeable to both ions of $OH^-$ and $H^+$ and permeable to any other ions.

Hydroxide barrier membranes can be formed from ionic exchange membranes of hydrophilic, polymeric, or porous materials having an ionic dependent group. Nonlimiting examples of such membranes include those having carboxylic, sulfonic, sulfonamide, phosphonic, or nitrate groups. Such membranes are readily commercially available.

Nonlimiting examples of hydroxide barrier membranes useful in the present invention include RAI™ cation exchange membranes made by RAI Research Corporation or Nafion™ membranes made by E.I. DuPont de Nemours Company of Wilmington, Del., both being commercially available from Electrosynthesis, Inc. of East Amherst, N.Y.

Hydrogen ion barrier membranes could be those membranes that are hydrophilic, polymeric, and have dependent groups such as amines.

Usefulness of the Invention

Cathodic Protection of Reinforced Concrete

A preferred use of the present invention is to cathodically protect reinforced concrete and specifically the rebars embedded within such concrete. As is known to those skilled in the art, one can create a galvanic circuit by employing sacrificial zinc anodes onto concrete structures for cathodic protection of the ferric rebars. Ionically conductive adhesives can be used to attach such sacrificial zinc anodes onto concrete structures for cathodic protection.

The major problem of existing adhesives is inherently short lifetimes due to the build-up of zinc oxidation reaction products at the interface between zinc and the adhesive, which leads to the passivation of the zinc electrode. The passivation of the zinc electrode is due to the formation of insoluble products such as zinc hydroxide and zinc oxide which are formed under alkaline pH conditions.

It has been found in the present invention that the pH of an adhesive will rise from about 4 to about the pH of the concrete within 100 hours after the adhesive is applied on the concrete because the typical pH of concrete is in the range from between 11 and 13. Due to this inherent rise in pH, the formation of a passivation layer according to Equation 1 described above is therefore unavoidable unless there is a means provided to reduce the formation of the passivation layer of the metal subject to anodic dissolution.

Figure 2:
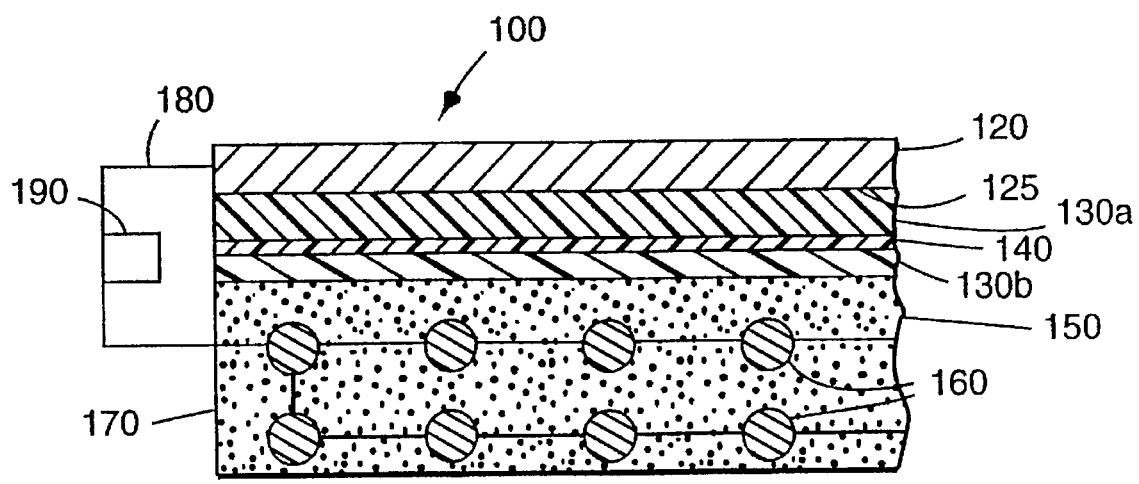
FIG. 2 is a cross-sectional view of a system for cathodic protection of the present invention using another embodiment of the ionically conductive agent of the present invention.

As explained previously, there are alternate embodiments to this means for reducing passivation of metal subject to anodic dissolution. FIGS. 1 and 2 show these alternate embodiments.

In FIG. 1, the means for reducing passivation is provided by the dissolution or dispersion of a complexing agent described above in the galvanically conductive medium.

FIG. 1 shows a system 10 for cathodic protection of reinforced concrete. System 10 comprises a layer of zinc 20. Sacrificial layer 20 contacts an ionically conductive pressure sensitive adhesive 30 having dispersed or dissolved therein, a complexing agent 40. Conductive adhesive 30 contacts concrete 50 having embedded therein two layers of rebars 60 mechanically connected. Emerging from end 70 is an electrical connection 80 that electrically connects reinforcement bars 60 to sacrificial layer 20. A galvanic circuit is created from rebars 60 through connection 80 to layer 20, which is completed by the migration of ions from layer 20 toward reinforcing bars 60. Without the presence of complexing agent 40, zinc hydroxide forms at or near surface 25 of layer 20 contacting adhesive 30. After continuous formation of zinc hydroxide at or near surface 25, the galvanic circuit will cease functioning prior to exhaustion of layer 20 designed to preserve rebars 60 from the effects of corrosion.

Optionally, to enhance the protection of rebars in concrete of low conductivity, electrical power supply 90 can be introduced to connection 80 between rebars 60 and layer 20 to provide an adequate current density in concrete of lower conductivity in the galvanic circuit. Lower conductivity is present in colder, dryer climates. Concrete structures in these colder, dryer climates nonetheless require protection from corrosion caused by salt spray on highways, in parking decks, and the like. Corrosion increases as temperature and humidity rise. Cathodic protection in warmer, more humid climates may not need optional power supply 90 but is equally useful for bridges, balconies and other concrete structures that are exposed to humid, warm environments, particularly near salt water.

In the first embodiment, layer 20 is about 0.58 mm thick, adhesive 30 is about 1.3 mm thick, and can be applied in the form of a tape or other laminated structure or can be applied sequentially.

Depending on the duration of cathodic protection desired and the repetitiveness of periodic protection desired, tapes of various metallic thicknesses can be provided to concrete structures in the form of sheets or wraps to cover the exposed concrete surfaces.

Without being limited to a particular theory, it is believed that an ionic conductive agent of the present invention in the form of medium 30 having complexing agent 40 therein with a layer 20 of about 0.25 mm thickness can provide about ten years of cathodic protection to embedded layers of rebar 60 within concrete 50 with a current density of about $1.1 \times 10^{-3}$ mA/cm$^2$. It is preferred to cover all portions of reinforced concrete with the system for cathodic protection of the present invention to assure maximum protection available.

FIG. 2 shows a second embodiment of the present invention employing an ionically selective membrane as the means for reducing passivation.

System 100 comprises a layer 120 corresponding to layer 20 in FIG. 1 contacting an ionically conductive agent comprising an ionically conductive medium separate into portions 130a and 130b by an ionically selective membrane 140. The ionically conductive medium 130b contacts concrete 150 having embedded therein two layers of rebars 160. Emerging from end 170 is an electrical connection 180 between rebars 160 and layer 120. Optionally, power supply 190 may be added in conditions where low conductivity of concrete is present. In the event that power is supplied, a range sufficient to maintain current density is desired.

The location of membrane 140 within ionically conductive medium 130 is unlimited. But it is preferred that membrane 140 should be disposed very near concrete 150 to minimize the flow of hydroxide ions from concrete 150 into ionically conductive medium 130a.

While it is preferred that a same or similar pressure sensitive adhesive be employed for both layers 130a and 130b, it is also contemplated that different pressure sensitive adhesives having different ionic conductivity, pH, and other properties can be provided between layers 130a and 130b.

Batteries and Electroplating

The usefulness of the present invention also extends to aqueous alkaline solutions such as zinc/alkaline batteries and in electroplating of zinc onto another metal. In both instances, it is important to minimize the formation of a passivation layer on the surface of the zinc that otherwise inhibits the dissolution of the zinc anode. In alkaline solutions, the passivation behavior is the intrinsic characteristic of the zinc anode. If the current density is greater than the limiting value, initial anode dissolution of zinc is always followed by passivation, which results in formation of $Zn(OH)_2$ and ZnO. Thus, one can employ a means for reducing passivation by using a complexing agent described above.

While embodiments of the invention have been disclosed, the following examples provide specific evidence of the unexpected advantages of the present invention.

EXAMPLES

Example 1

Cyclic Voltammetry of Zinc in 0.95M NaCl Solutions

Figure 3:
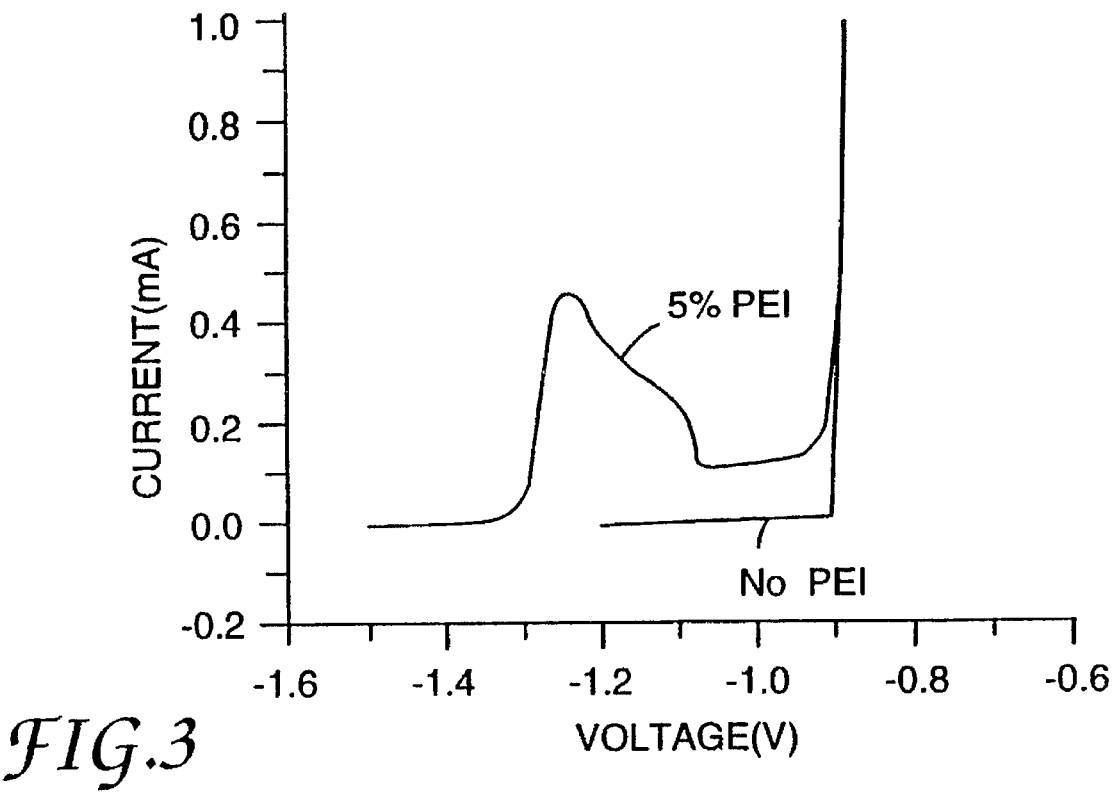
FIG. 3 is a graph of a cyclical voltammogram of zinc at pH 11 showing the improvement of the use of a complexing agent in the ionically conductive agent according to the present invention.
Figure 4:
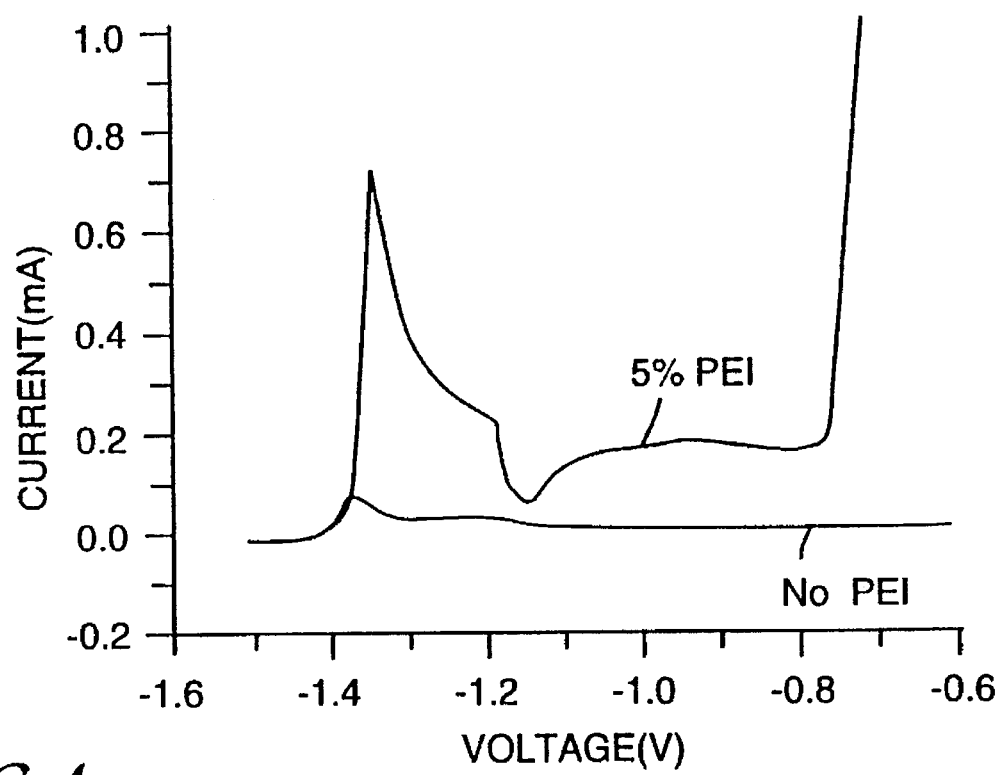
FIG. 4 is a graph of a cyclical voltammogram of zinc at pH 13 showing the improvement of the use of a complexing agent in the ionically conductive agent according to the present invention.

Cyclic voltammetry was performed using a three-compartment glass cell and a PARC 273A Potentiostat/ Galvanostat. A zinc disk of 0.08 cm$^2$ encased in a Kel-F™ plastic sheath commercially available from Bioanalytical Systems, Inc. of West Lafayette, Ind. was used as the working electrode. The reference and counter electrodes are a standard calomel electrode (SCE) and a platinum wire, respectively. A 0.95M NaCl solution was chosen as the base solution and the pH of the solution was adjusted with NaOH or HCl. The experiment was done at room temperature (22° C.) under air. The cyclic voltammograms were obtained by scanning the potential at a rate of 5 mV/s starting at the open circuit potential. FIGS. 3 and 4 compares the results between the solutions with and without PEI at two different pH's, 11 and 13, respectively.

The PEI (M.W. of 60,000 Daltons) was added in an amount of 5 weight percent of the total solution weight. PEI is commercially available from Aldrich Chemicals.

In the PEI free solutions, a sharp increase in current relating to the dissolution of Zn metal into $Zn^{2+}$ and electrons was observed at about $-0.90$ V at pH 11, while at pH 13, only a small current plateau relating to the reaction described in Equation 1 above was visible at a potential between $-1.2$ and $-1.4$ V, indicating that the zinc electrode was passivated shortly after dissolution at pH 13. The presence of PEI in the solutions, however, altered the behavior of zinc dissolution dramatically. At pH 11, a large asymmetric current peak in addition to the sharp current increase was observed with PEI. The additional peak in the PEI containing solutions was the result of the strong interaction between PEI and $Zn^{2+}$ produced. At pH 13, both a large asymmetric current peak at between $-1.2$ and $-1.4$ V and a sharp current increase at $-0.8$ V were observed with PEI, indicating that the zinc electrode was no longer passivated at this pH with the presence of PEI. Two advantages using PEI were clearly demonstrated:

(i) The complexing agent enabled the zinc dissolution reaction to occur at a large extent at more negative potentials (zinc is usually used as a negative electrode in the battery and cathodic protection system, and thus the more negative the potential is, the better).

(ii) The complexing agent inhibited the passivation process of zinc at pH 13.

Example 2

Short Circuit Test in 0.95M NaCl Solutions Containing 0.1N NaOH

A piece of zinc foil and a piece of steel foil were immersed in a 0.95M NaCl solution containing 0.1N NaOH in a plastic beaker. 5 weight percent of PEI was included in the solution. Both foils were parallel to each other and separated by a distance of about 6 cm. After the electrical connections between the two foils were made, the system was monitored for one week. For the solution with PEI, gas bubbles were generated at the steel foil during the test that lasted one week, indicating a large extent of current flow. The gas was presumably hydrogen. During the entire test, the solution was still clear.

The experiment was repeated, for comparison, on a 0.95M NaCl solution containing 0.1N NaOH without PEI. No bubbles were visible in the PEI free solution, indicating a small extent of current flow. After testing for one week, considerable amounts of white precipitate built up at the zinc electrode and in the solution. The white precipitate was presumably associated with the formation of insoluble $Zn(OH)_2$. This comparison example of two solutions, one with PEI and one without PEI, clearly demonstrated that the PEI increases the reaction rate of zinc dissolution and solubilizes the reaction products as well.

Comparative Example 3 and Example 4 Test on a Concrete Block in a Humidity Chamber of 40° C. and 80% RH An ionically conductive agent of the construction according to FIG. 1 in Example 4 having a complexing agent in the pressure sensitive adhesive was compared with an ionically conductive pressure sensitive adhesive without complexing agent of Comparative Example 3. In both instances a piece of Zinc foil (8.84 $cm^2$, 0.5 mm thick) was attached on a concrete block by one of the adhesives described below.

The adhesive for Comparative Example 3 was prepared by dissolving 1.265 g KCl into 30.00 g of a 50% weight aqueous solution of acrylamido-2-methylpropanesulfonic acid, sodium salt solution ("AMPS") (commercially available as 2405 solution from Lubrizol, Inc. of Wickliffe, Ohio), followed by the addition of 30.16 g glycerin, 0.06 g N,N'-methylenebisacrylamide, 0.06 g of 2,2-dimethoxy-2-phenyl-acetophenone, and 0.48 g acrylic acid. A cell of a poly(tetrafluoroethylene) gasket 0.4 cm thick, two glass plates, and two silicone treated polyester release films (0.05 mm thick) was assembled and held together with clamps. The solution was purged with nitrogen and injected by syringe into the assembled cell at a thickness of 0.4 cm. The solution was then irradiated for 30 minutes using a 20 W 350 nm light (Model F20T12 350BL commercially available from Sylvania) at an average intensity of 1.2 $mW/cm^2$.

The adhesive for Example 4 was prepared by dissolving 1.02 g KCl into 24.25 g AMPS (as in Comparative Example 3), followed by addition of 24.25 g glycerin, 0.048 g N,N'-methylenebisacrylamide, 0.048 g of 2,2-dimethoxy-2-phenyl-acetophenone, 0.384 g acrylic acid, and 5.01 g of a PEI solution (M.W. of 60,000 Daltons 50% solution in water from Aldrich Chemicals). The solution was polymerized in the same manner as Comparative Example 3.

After the adhesive of Comparative Example 3 and the adhesive of Example 4 were prepared, each were laminated to the zinc foil and applied to a concrete test block for a test of the lifetime of the zinc foil and adhesive.

The concrete test block was 25.4 cm long, 15.24 cm wide, and 12.7 cm high containing four No. 4 rebars. The rebars had a length of 25.4 cm in the concrete and extended 9 cm outside of the concrete. Five sides of the concrete test block were sealed with an epoxy paint to limit exposure to the atmosphere to only be the top surface.

The upper 6.35 cm of concrete had 3.6 $kg/m^3$ (6 lbs./$yd^3$) of chloride (provided in the form of NaCl at about 4 kg mixed into the concrete. The lower 6.35 cm of concrete had no chloride mixed therein. The rebars were configured in the concrete such that there were two columns of rebars about 7.62 cm apart and two rows about 5.08 cm apart. One row of rebars was in the upper half of the concrete, and the second row of rebars was in the lower half of the concrete. The upper row of rebars was 3.81 cm from the top of the concrete block to which the zinc plate was adhered.

The rebars where electrically connected to each other through a #14 gage copper wire soldered onto the end surface of the rebars with the paint removed. In order to accelerate the lifetime test of the zinc foil and adhesive in each example, a battery tester (commercially available from Macro Inc.) was used to energize the cathodic protection system by attaching the positive lead of the test channel to the zinc anode and by attaching the negative lead to the electrically connected set of rebars.

The system was charged at a current of 1 mA until the voltage drop across the system reached 10 V. The total charge passed was measured.

In Example 4, with PEI complexing agent, the total charge passed was measured as 38.7 mA-Hrs/$cm^2$ (which is estimated to yield a useful life of 4.1 years if a current density of $1.1 \times 10^{-3}$ mA/$cm^2$ is assumed to exist for an actual cathodic protection system).

In Comparative Example 3, without PEI complexing agent, the total charge passed was measured as 28.7 mA-Hrs/cm$^2$ (which is estimated to yield a useful life of about 3.0 years if a current density of $1.1\times10^{-3}$ mA/cm$^2$ is assumed to exist for an actual cathodic protection system).

This direct comparison showed that use of PEI complexing agent as a means to reduce passivation of metal subject to anodic dissolution unexpectedly provided a 36 percent increase in useful life of the cathodic protection system.

Example 5

Test in 0.1N KOH Solution Containing 5% NaCl

A cation exchange membrane (RAI 1010 commercially available from Electrolysis, Inc. was O-ring sealed at the side opening (7 cm$^2$) of a glass cell, which contains 0.1N KOH solution with 5% NaCl. A small piece of PROMEON™ ionically conductive adhesive (commercially available from Medtronic of Minneapolis, MN 0.43 mm thick) was applied on the membrane, and then a zinc foil (1 cm$^2$, 0.10 mm thick) was attached to the adhesive. The cell was charged at a current density of 5 mA using a battery tester as in Examples 3 and 4 with the zinc foil as the positive and a platinum coated titanium mesh of large area immersed in the solution as the negative. The voltage drop across the cell reached 10 V after a total charge of 27.5 mA-Hrs was passed. This amount of charge is equivalent to a three year lifetime if a current density of 1 mA/ft$^2$ or $1.1\times10^{-3}$ mA/cm$^2$ is assumed in the actual product system. A large amount of white precipitate was found on the solution side of the membrane, while no precipitate was visible in the adhesive. This indicated that the zinc oxidation reaction products are indeed being transported out of the adhesive and through the membrane.

Comparative Example 6 and Example 7

Test on a Concrete Block in a Humidity Chamber with 40°C. and 80% RH

Ionically conductive pressure sensitive adhesives with and without a membrane as the means for reducing passivation of metal subject to anodic dissolution were prepared.

For Comparative Example 6, a small piece of zinc foil (7.7 cm$^2$, 0.5 mm thick) was attached to a concrete test block as described in Examples 3 and 4 by the Promeon™ adhesive described in Example 5. The system was charged at a current density of 1 mA as in Examples 3 and 4 with the zinc foil as the positive and the rebars inside the concrete as the negative until the voltage drop across the system reached 10 V.

For Comparative Example 6, a charge of 9.18 mA-Hrs/cm$^2$ was measured, (which is estimated to yield a useful life of 0.97 years if a current density of $1.1\times10^{-3}$ mA/cm$^2$ is assumed to exist for an actual cathodic protection system).

The experiment was repeated as Example 7, except that the membrane of Example 5 was included in the adhesive. For Example 7, a charge of 29.4 mA-Hrs/cm$^2$ was measured, (which is estimated to yield a useful life of about 2.11 years if a current density of $1.1\times10^{-3}$ mA/cm$^2$ is assumed to exist for an actual cathodic protection system).

This direct comparison showed that use of a membrane as a means to reduce passivation of metal subject to anodic dissolution unexpectedly provided a 217 percent increase in useful life of the cathodic protection system.

The invention is not limited to the foregoing embodiments. The scope of the invention is indicated in claims that follow and their equivalents.

What is claimed is:

1. An ionically conductive agent for sacrificial galvanically active metals in an electrochemical system, comprising:

(a) a layer of a hydrophilic, ionically conductive pressure sensitive adhesive having a complexing agent dispersed or dissolved therein, wherein the complexing agent is selected from the group consisting of poly(vinyl amines), poly(allyl amines), poly (alkylene amines), poly(ethylenimine), polyvinyl pyridines, poly(vinyl pyrroles), poly(N-vinyl lactams), poly(alkylene oxides), and combinations thereof.

2. The ionically conductive agent according to claim 1, wherein the electrochemical system includes a galvanic circuit and wherein the complexing agent solubilizes galvanically active metallic ions in the galvanic circuit in the electrochemical system and prevents formation of a passivation layer.

3. The ionically conductie agent according to claim 1, wherein the ionically conductive medium is an ionically conductive pressure sensitive adhesive selected from the group consisting of poly(acrylamido-2-methyl-propanesulfonic acid) and salts thereof, a N-vinyl-pyrrolidone/acrylic acid copolymer pressure sensitive adhesive, a polymerized microemulsion pressure sensitive adhesive, and combinations thereof; and wherein the complexing agent is poly(ethylenimine).

4. The ionically conductive agent according to claim 3, wherein the ionically conductive pressure sensitive adhesive contains electrolyte.

5. A system for cathodic protection of a galvanically active metal from corrosion, comprising:

(a) an ionically conductive agent according to claim 1;

(b) a layer of sacrificial galvanically active metal having a greater dissolution potential than the galvanically active metal to be protected, the sacrificial metal layer contacting the ionically conductive layer; and (c) electrical connection between the sacrificial galvanically active metal layer and the galvanically active metal to be protected.

6. A structure protected by the system of claim 5.

7. The structure according to claim 6, wherein the galvanically active metal to be protected is a reinforcing bar embedded in concrete forming a transportation bridge.

8. The structure according to claim 6, wherein the galvanically active metal to be protected is a reinforcing bar embedded in concrete forming a transportation roadway.

9. The structure according to claim 6, wherein the galvanically active metal to be protected is a reinforcing bar embedded in concrete forming a building.

10. The structure according to claim 9, wherein the building is a motor vehicle parking facility.

11. The structure according to claim 9, wherein the building has balconies exposed to a surrounding corrosive environment.

12. A method for the protection of structures through the dissolution of sacrificial galvanically active metal anodes comprising the steps of applying the ionically conductive agent of claim 1 to a sacrificial galvanically active metal anode and creating a galvanic circuit.

13. A method for the protection of a structure having a galvanically active metal to be protected through the dissolution of a sacrificial galvanically active metal anode comprising the steps of applying a system to the structure and creating a galvanic circuit, wherein the system comprises:

(a) an ionically conductive agent according to claim 1, (b) a layer of sacrificial galvanically active metal having a greater dissolution potential than the galvanically active metal to be protected, the sacrificial metal layer contacting the ionically conductive layer; and (c) electrical connection between the sacrificial galvanically active metal layer and the galvanically active metal to be protected.

14. An apparatus for the cathodic protection of galvanically active metals embedded in concrete comprising the ionically conductive agent of claim 1.

15. A battery comprising the ionically conductive agent of claim 1.

16. A structure of galvanically active metal directly exposed to a surrounding corrosive environment, protected by a system, comprising:

(a) an ionically conductive agent according to claim 1 contacting the galvanically active metallic structure, (b) a layer of sacrificial gavanically active metal having a greater dissolution potential than the galvanically active metallic structure to be protected, the layer of sacrificial galvanically active metal contacting the ionically conductive medium; and (c) electrical connection between the sacrificial galvanically active metal layer and the galvanically active metallic structure to be protected.

17. The structure according to claim 16, wherein the corrosive environment is earth.

18. The structure according to claim 16, wherein the corrosive environment is air.

19. The structure according to claim 16, wherein the corosive environment is water.

20. The structure according to claim 19, wherein the corrosive environment is salt water.

* * * * *